United States Patent
Mason, III et al.

(10) Patent No.: US 10,774,664 B2
(45) Date of Patent: Sep. 15, 2020

(54) PLENUM FOR COOLING TURBINE FLOWPATH COMPONENTS AND BLADES

(71) Applicant: General Electric Company, Schenectady, NY (US)

(72) Inventors: John Rogers Mason, III, Liberty, SC (US); Zhongman Ding, Greenville, SC (US); John Lesley DuBose, Greenville, SC (US)

(73) Assignee: General Electric Company, Schenectady, NY (US)

(*) Notice: Subject to any disclaimer, the term of this patent is extended or adjusted under 35 U.S.C. 154(b) by 625 days.

(21) Appl. No.: 15/617,288

(22) Filed: Jun. 8, 2017

(65) Prior Publication Data
US 2018/0355798 A1 Dec. 13, 2018

(51) Int. Cl.
*F01D 9/06* (2006.01)
*F01D 11/24* (2006.01)
*F02C 7/12* (2006.01)
*F01D 25/24* (2006.01)

(52) U.S. Cl.
CPC .............. *F01D 9/065* (2013.01); *F01D 11/24* (2013.01); *F01D 25/246* (2013.01); *F02C 7/12* (2013.01)

(58) Field of Classification Search
CPC ........ F02C 7/18; F05D 2260/20; F01D 5/081; F01D 5/187; F01D 9/065; F01D 11/24; F01D 25/12

USPC .............................................. 415/115, 173.2
See application file for complete search history.

(56) References Cited

U.S. PATENT DOCUMENTS

| | | | | |
|---|---|---|---|---|
| 4,841,726 | A * | 6/1989 | Burkhardt | F01D 11/24 415/116 |
| 5,363,653 | A * | 11/1994 | Zimmermann | F01D 9/023 60/751 |
| 2016/0319841 | A1* | 11/2016 | McCaffrey | F01D 11/24 |

* cited by examiner

*Primary Examiner* — Todd E Manahan
*Assistant Examiner* — Sean V Meiller
(74) *Attorney, Agent, or Firm* — Charlotte C. Wilson; James W. Pemrick

(57) ABSTRACT

A gas turbine having an annular flowpath defined between concentric inner radial and outer radial boundaries. A plenum is positioned just outboard of the outer radial boundary that wraps circumferentially in spaced relation thereto. The height of the plenum is defined radially between a floor and ceiling. The plenum includes an inlet formed through the ceiling at a first end and spaced outlet ports formed through the floor. The plenum includes a divider baffle that spans the width of the plenum and extends between the first end and the second end of the plenum so to divide the plenum into radially stacked first and second compartments. The first compartment connects directly to the inlet, while the second compartment connects directly to the outlet ports. The height of the first compartment tapers between a greater height at the first end and a lesser height at the second end of the plenum.

19 Claims, 6 Drawing Sheets

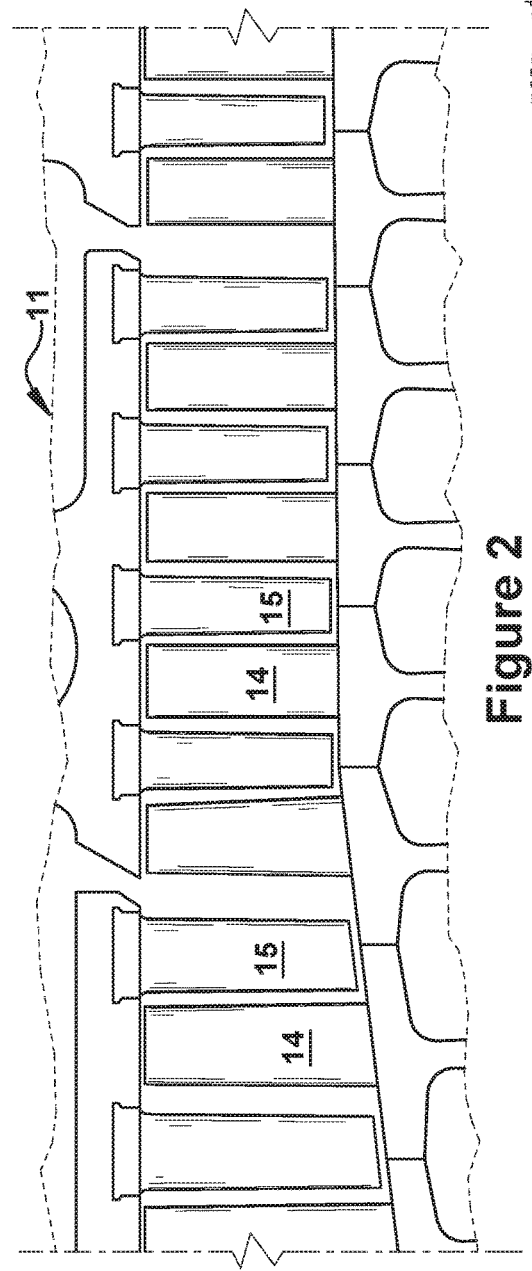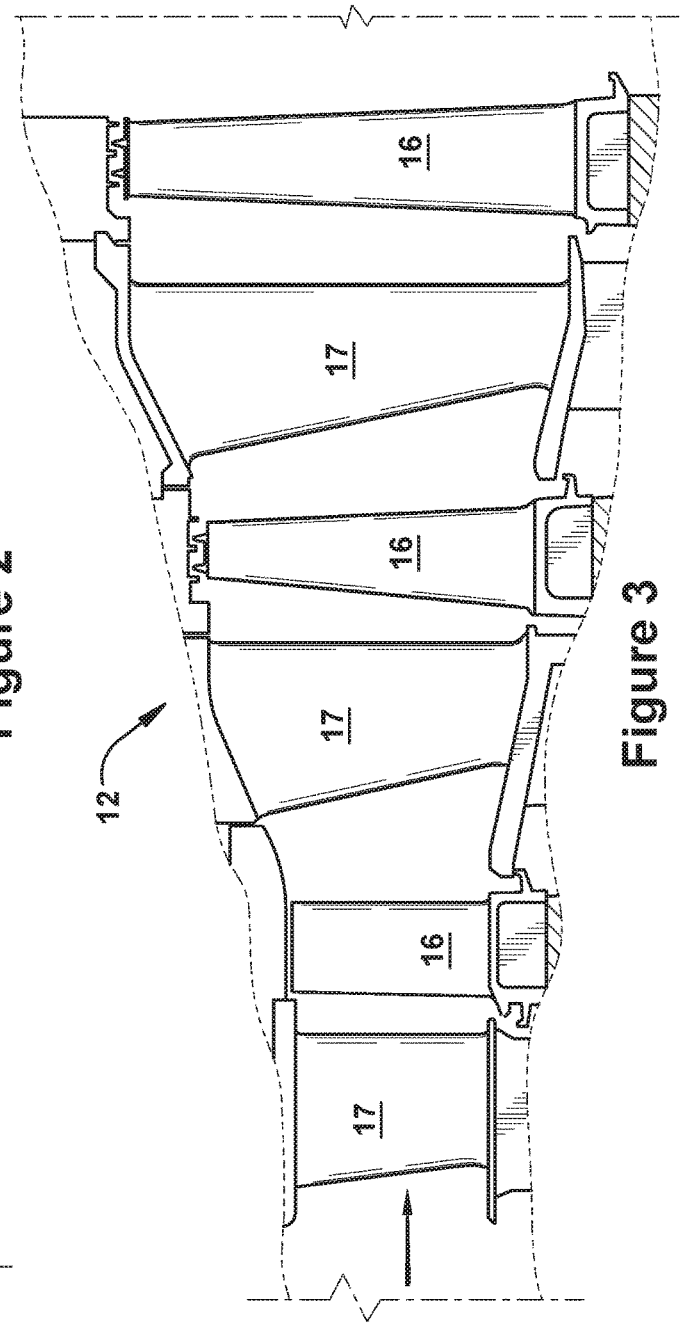

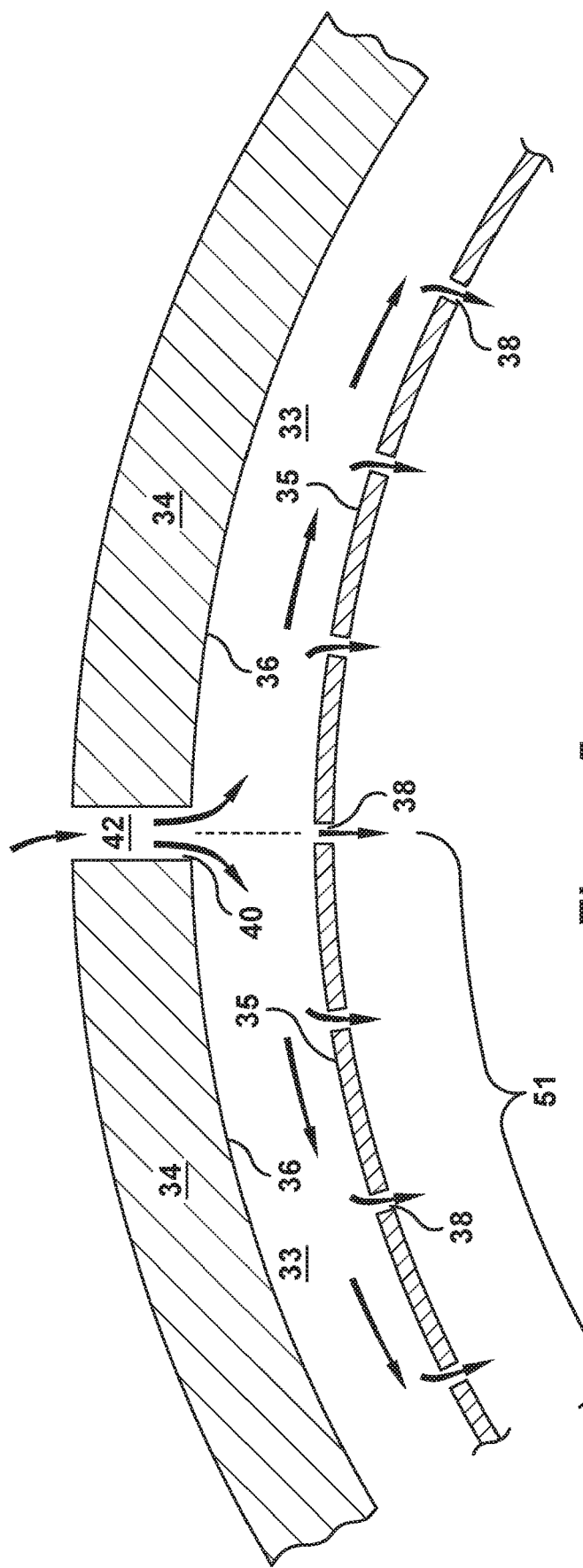

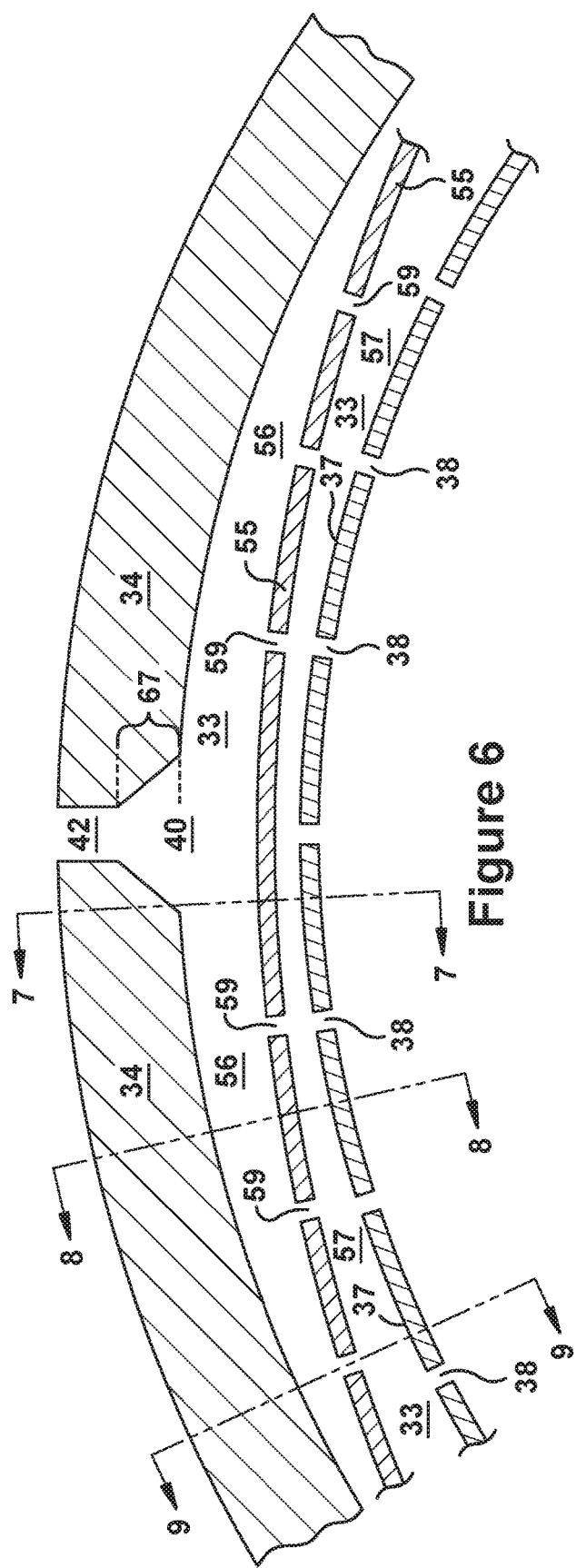
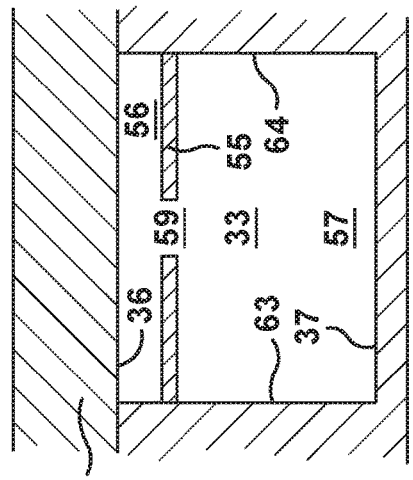
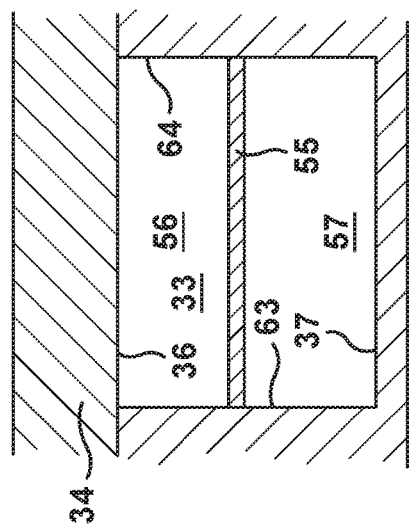
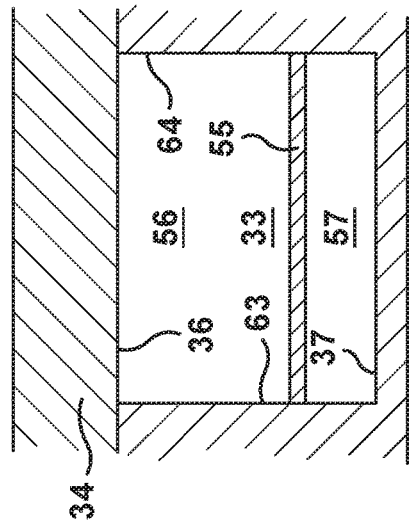

PLENUM FOR COOLING TURBINE FLOWPATH COMPONENTS AND BLADES

BACKGROUND OF THE INVENTION

This present application relates to cooling hot gas path components in combustion or gas turbine engines. More specifically, but not by way of limitation, the present application relates to a plenum configuration for delivering coolant to turbine stator blades.

Generally, combustion or gas turbine engines (hereinafter "gas turbines") include compressor and turbine sections in which rows of blades are axially stacked in stages. Each stage typically includes a row of circumferentially-spaced stator blades, which are fixed, and a row of rotor blades, which rotate about a central turbine axis or shaft. In operation, generally, the compressor rotor blades are rotated about the shaft, and, acting in concert with the stator blades, compress a flow of air. This supply of compressed air then is used within a combustor to combust a supply of fuel. The resulting flow of hot expanding combustion gases, which is often referred to as working fluid, is then expanded through the turbine section of the engine. Within the turbine, the working fluid is redirected by the stator blades onto the rotor blades so to power rotation. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, so to produce the supply of compressed air needed for combustion, as well as, rotate the coils of a generator so to generate electrical power. During operation, because of the high temperatures, velocity of the working fluid, and rotational velocity of the engine, many of the components within the hot gas path become highly stressed by the resulting mechanical and thermal loads.

Many industrial applications, such as those involving power generation and aviation, still rely heavily on gas turbines, and because of this, the engineering of more efficient engines remains an ongoing and important objective. As will be appreciated, even incremental advances in machine performance, efficiency, or cost-effectiveness are meaningful in the highly competitive markets that have evolved around this technology. While there are several known strategies for improving the efficiency of gas turbines, such as, for example, increasing the size of the engine, firing temperatures, or rotational velocities, each of these generally places additional strain on hot-gas path components. As a result, there remains a need for improved apparatus, methods or systems that alleviate such operational stresses or, alternatively, that enhance the durability of such components so they may better withstand them.

As will be appreciated, this need is particularly evident in regard to turbine stator blades, where marketplace competitiveness is exceedingly high and the many design considerations are complex and often competing. As such, designs for more effectively delivering coolant to stator blades—such as those presented herein in relation to a novel plenum configuration—which also succeed in balancing the many other applicable design considerations represent technological advances having considerable economic value.

BRIEF DESCRIPTION OF THE INVENTION

The present application thus describes a gas turbine that includes a turbine having an annular flowpath through which a working fluid is channeled. The annular flowpath is defined between concentric inner radial and outer radial boundaries that are formed about a central axis, relative to which radial, axial, and circumferential directions may be defined. The annular flowpath may include a row of rotor blades and a row of stator blades that have circumferentially spaced rotor blades and stator blades, respectively. The turbine further may include a plenum positioned just outboard of the outer radial boundary of the annular flowpath that wraps circumferentially in spaced relation to the outer radial boundary of the annular flowpath. The plenum may further include: a width defined in an axial direction that axially overlaps with the row of stator blades; a length defined in the circumferential direction that extends between a first end and a second end of the plenum; and a height defined in the radial direction between a floor, which is an inboard interior wall of the plenum, and a ceiling, which is an outboard interior wall of the plenum. The plenum may include an inlet formed through the ceiling of the plenum at the first end and outlet ports formed through the floor of the plenum and spaced between the first end and the second end of the plenum. The plenum may include a divider baffle that spans the width of the plenum and extends between the first end and the second end of the plenum so to divide the plenum into radially stacked first and second compartments. The first compartment may connect directly to the inlet, while the second compartment may connect directly to the outlet ports. The divider baffle may be configured such that a height of the first compartment varies along the length of the plenum. The height of the first compartment may taper between a greater height at the first end of the plenum and a lesser height at the second end of the plenum.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 2 is a sectional view of the compressor section of the gas turbine of FIG. 1;

FIG. 3 is a sectional view of the turbine section of the gas turbine of FIG. 1;

FIG. 5 is an axial section view of the plenum of FIG. 4;

FIG. 6 is an axial section of view of the plenum of FIG. 5 in which is included a divider baffle in accordance with the present invention;

FIG. 7 is a sectional view along sight lines 7-7 of FIG. 6;

FIG. 8 is a sectional view along sight lines 8-8 of FIG. 6;

FIG. 9 is a sectional view along sight lines 9-9 of FIG. 6;

DETAILED DESCRIPTION OF THE INVENTION

Figure 1:
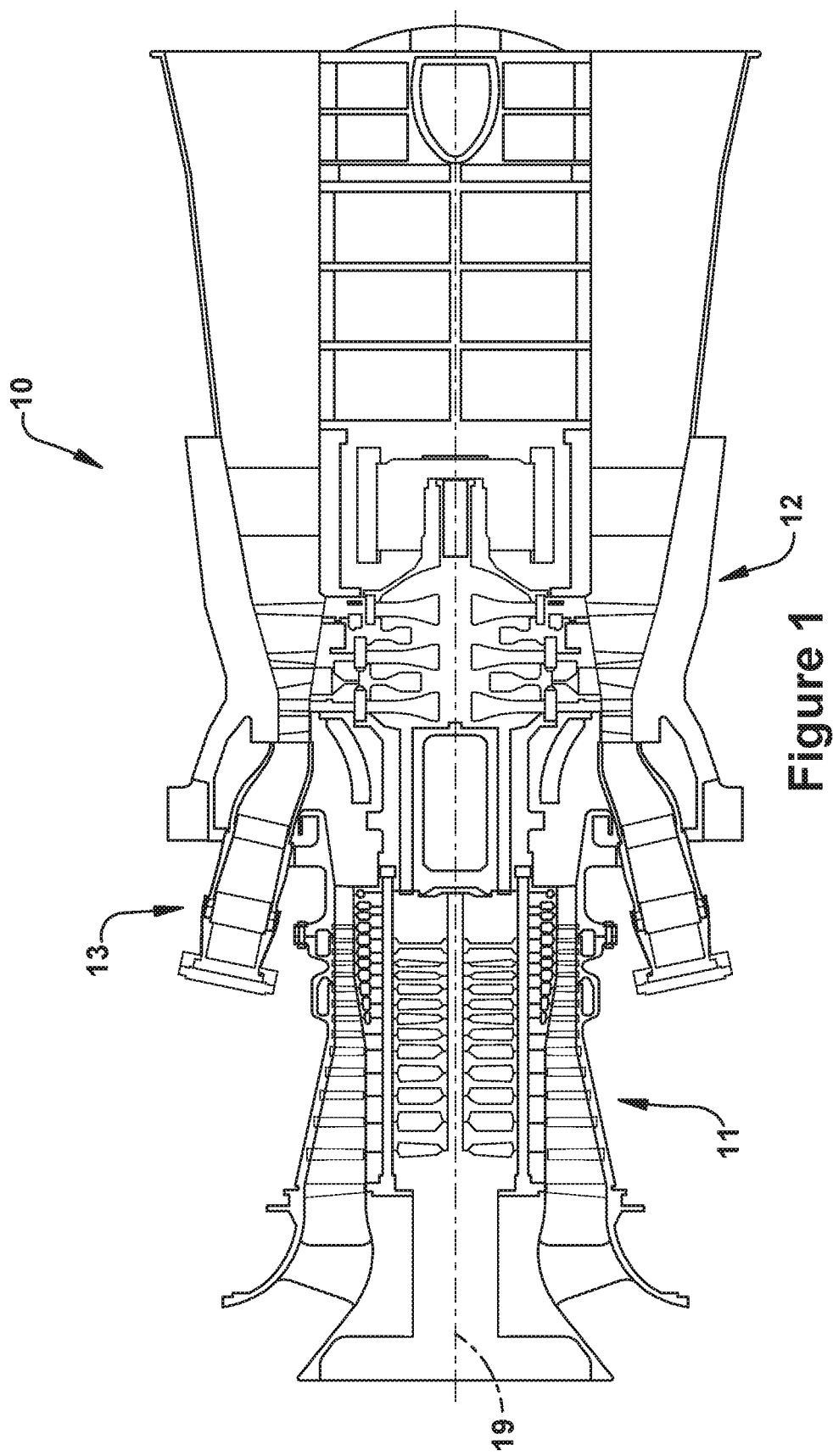
FIG. 1 is a schematic representation of an exemplary gas turbine that may include turbine blades according to aspects and embodiments of the present application.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciated that such terms often are subject to differing interpretations. For example, what may be referred to herein as a single component, may be referenced elsewhere as consisting of multiple components, or, what may be referenced herein as including multiple components, may be referred to elsewhere as being a single component. Thus, in understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would the understood by a person of ordinary skill in the relevant technological arts. Accordingly, it should be understood that, unless otherwise stated, the usage herein of the term "gas turbine" is intended broadly and with limitation as the applicability of the present invention to the various types of turbine engines.

Given the nature of how gas turbines operate, several terms prove particularly useful in describing certain aspects of their function. As will be understood, these terms may be used both in describing or claiming the gas turbine or one of the subsystems thereof—e.g., the compressor, combustor, or turbine—as well as to describe or claim components or subcomponents for usage therewithin. In the latter case, the terminology should be understood as describing those components as they would be upon proper installation and/or function within the gas turbine engine or primary subsystem. These terms and their definitions, unless specifically stated otherwise, are as follows.

The terms "forward" and "aftward" refer to directions relative to the orientation of the gas turbine and, more specifically, the relative positioning of the compressor and turbine sections of the engine. Thus, as used therein, the term "forward" refers to the compressor end while "aftward" refers to the turbine end. It will be appreciated that each of these terms may be used to indicate direction of movement or relative position along the central axis of the engine. As stated above, these terms may be used to describe attributes of the gas turbine or one of its primary subsystems, as well as for components or subcomponents positioned therewithin. Thus, for example, when a component, such as a rotor blade, is described or claimed as having a "forward face", it may be understood as referring to a face that faces toward the forward direction as defined by the orientation of the gas turbine (i.e., the compressor being designated as the forward end and turbine being designated as the aftward end). To take a major subsystem like the turbine as another example (and assuming a typical gas turbine arrangement such as the one shown in FIG. 1), the forward and aftward directions may be defined relative to a forward end of the turbine, at where a working fluid enters the turbine, and an aftward end of the turbine, at where the working fluid exits the turbine.

The terms "downstream" and "upstream" are used herein to indicate position within a specified conduit or flowpath relative to the direction of flow (hereinafter "flow direction") moving through it. Thus, the term "downstream" refers to the direction in which a fluid is flowing through the specified conduit, while "upstream" refers to the direction opposite that. These terms may be construed as referring to the flow direction through the conduit given normal or anticipated operation. As will be appreciated, within the compressor and turbine sections of the gas turbine, the working fluid is directed downstream and through an annularly shaped working fluid flowpath, which is typically defined about the central and common axis of the gas engine. As such, within the compressor and turbine sections of the engine, the term "flow direction", as used herein, refers to a reference direction representing an idealized direction of flow of working fluid through the working fluid flowpath of the engine during an expected or normal condition of operation. Thus, within the compressor and turbine sections, the "flow direction" terminology is referring to flow that is parallel to the central axis of the gas turbine and oriented in the downstream or aftward direction.

Thus, for example, the flow of working fluid through the working fluid flowpath of the gas turbine may be described as beginning as air pressurized through the compressor per the flow direction, becoming combustion gases in the combustor upon being combusted with a fuel, and, finally, being expanded per the flow direction as it passed through the turbine. Likewise, the flow of working fluid may be described as beginning at a forward or upstream location toward a forward or upstream end of the gas turbine, moving generally in a downstream or aftward direction, and, finally, terminating at an aftward or downstream location toward an aftward or downstream end of the gas turbine.

As many components of gas turbines rotate during operation, such as compressor and turbine rotor blades, the terms rotationally lead and rotationally trail may be used to delineate relative positioning of subcomponents or subregions per the expected rotation within the engine. Thus, as will be appreciated, these terms may differentiate position per the direction of rotation (hereinafter "rotation direction") within the compressor or turbine. As used herein, such rotation direction may be understood as being the expected direction of rotation for a component given normal or anticipated operation of the gas turbine.

In addition, given the configuration of gas turbines, particularly the arrangement of the compressor and turbine sections about a common shaft or rotor, as well as the cylindrical configuration common to many combustor types, terms describing position relative to an axis may be regularly used herein. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as being either "radially inward" or "inboard" of the second component. If, on the other hand, the first component resides further from the central axis, the first component will be described as being either "radially outward" or "outboard" of the second component. As used herein, the term "axial" refers to movement or position parallel to an axis, while the term "circumferential" refers to movement or position around an axis. Unless otherwise stated or plainly contextually apparent, these terms should be construed as relating to the central axis of the compressor and/or turbine sections of the gas turbine as defined by the rotor extending through each, even if the terms are describing or claiming attributes of non-integral components—such as rotor or stator blades—that function therein. When otherwise stated, the terms may be used relative to the longitudinal axis of certain components or subsystems within the gas turbine, such as, for example, the longitudinal axis around which conventional cylindrical or "can" combustors are typically arranged.

Finally, the term "rotor blade", without further specificity, is a reference to the rotating blades of either the compressor or the turbine, and so may include both compressor rotor blades and turbine rotor blades. The term "stator blade", without further specificity, is a reference to the stationary blades of either the compressor or the turbine and so may include both compressor stator blades and turbine stator blades. The term "blades" may be used to generally refer to either type of blade. Thus, without further specificity, the term "blades" is inclusive to all type of turbine engine blades, including compressor rotor blades, compressor stator blades, turbine rotor blades, turbine stator blades and the like.

By way of background, referring now with specificity to the figures, FIGS. 1 through 3 illustrate an exemplary gas turbine in accordance with the present invention or within which the present invention may be used. It will be understood by those skilled in the art that the present invention may not be limited to this type of usage. As stated, the present invention may be used in gas turbines, such as the engines used in power generation and airplanes, steam turbine engines, as well as other types of rotary engines as would be recognized by one of ordinary skill in the art. The examples provided, thus, are not meant to be limiting unless otherwise stated.

FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 11 that is mechanically coupled by a common shaft or rotor to a downstream turbine section or turbine 12, and a combustor 13 positioned between the compressor 11 and the turbine 12. As illustrated in FIG. 1, the gas turbine may be formed about a common central axis 19.

FIG. 2 illustrates a view of an exemplary multi-staged axial compressor 11 that may be used in the gas turbine of FIG. 1. As shown, the compressor 11 may have a plurality of stages, each of which include a row of compressor rotor blades 14 and a row of compressor stator blades 15. Thus, a first stage may include a row of compressor rotor blades 14, which rotate about a central shaft, followed by a row of compressor stator blades 15, which remain stationary during operation.

FIG. 3 illustrates a partial view of an exemplary turbine section or turbine 12 that may be used in the gas turbine of FIG. 1. The turbine 12 also may include a plurality of stages. Three exemplary stages are illustrated, but more or less may be present. Each stage may include a plurality of turbine nozzles or stator blades 17, which remain stationary during operation, followed by a plurality of turbine buckets or rotor blades 16, which rotate about the shaft during operation. The turbine stator blades 17 generally are circumferentially spaced one from the other and fixed about the axis of rotation to an outer casing. The turbine rotor blades 16 may be mounted on a turbine wheel or rotor disc (not shown) for rotation about a central axis. It will be appreciated that the turbine stator blades 17 and turbine rotor blades 16 lie in the hot gas path or working fluid flowpath through the turbine 12. The direction of flow of the combustion gases or working fluid within the working fluid flowpath is indicated by the arrow.

In one example of operation for the gas turbine 10, the rotation of compressor rotor blades 14 within the axial compressor 11 may compress a flow of air. In the combustor 13, energy may be released when the compressed air is mixed with a fuel and ignited. The resulting flow of hot gases or working fluid from the combustor 13 is then directed over the turbine rotor blades 16, which induces the rotation of the turbine rotor blades 16 about the shaft. In this way, the energy of the flow of working fluid is transformed into the mechanical energy of the rotating blades and, given the connection between the rotor blades and the shaft, the rotating shaft. The mechanical energy of the shaft may then be used to drive the rotation of the compressor rotor blades 14, such that the necessary supply of compressed air is produced, and, for example, a generator to produce electricity.

Figure 4:
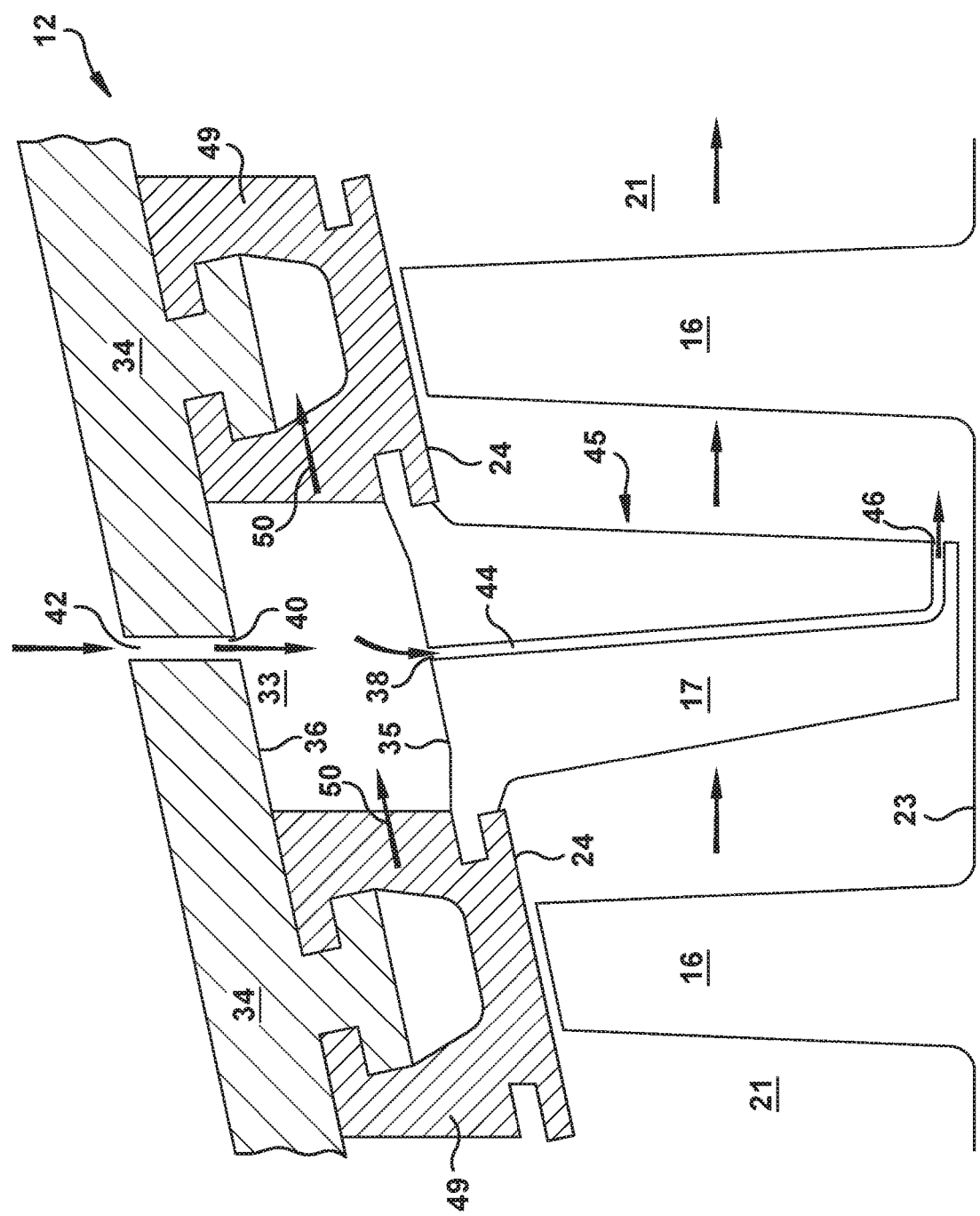
FIG. 4 is a sectional view of an exemplary working fluid flowpath and related structure of a turbine section of a gas turbine.

With reference now to FIGS. 4 and 5, views of an exemplary working fluid flowpath and related components are shown in relation to an exemplary turbine 12 within a gas turbine 10, such as those already discussed above in relation to FIGS. 1 through 3. As will be appreciated, FIG. 4 illustrates a sectional view the working fluid flowpath and surrounding structure, while FIG. 5 provides an alternate section view focused on a particular region of FIG. 4.

With specific reference now to FIG. 4, the turbine 12 includes an annular flowpath 21 through which a working fluid is channeled during operation. As will be appreciated, the annular flowpath 21 is defined between concentric inner radial and outer radial boundaries 23, 24, each of which is formed about the central axis 19 of the turbine 12. For descriptive purposes herein and unless otherwise stated, radial, axial, and circumferential directions should be understood as being defined relative to the central axis 19. As already described above, the annular flowpath 21 of the turbine 12 also includes alternating rows of rotor blades 16 and stator blades 17.

As further shown in FIG. 4, a plenum 33 is disposed just outboard of the outer radial boundary 24 of the annular flowpath 21. More specifically, the plenum 33 is formed between a turbine casing 34 and the depicted row of stator blades 17. As will be seen, the plenum 33 generally wraps circumferentially and in spaced relation to the outer radial boundary 24 of the annular flowpath 21, and is configured thusly so that it may be used to deliver a supply of coolant to the stator blades 17 that are positioned just inboard of it. As used herein, the plenum 33 may be described in relation to the central axis 19 of the turbine, wherein: a width of the plenum 33 is defined in the axial direction; a length of the plenum 33 is defined in the circumferential direction; and a height of the plenum 33 is defined in the radial direction.

Specifically, as used herein, the height of the plenum 33 is defined as the distance between a ceiling 36, which is an outboard interior wall of the plenum 33, and a floor 37, which is an inboard interior wall of the plenum 33. In regard to axial positioning, the plenum 33 is generally configured so that its width axially coincides or overlaps with the row of stator blades 17. As discussed more below, the plenum 33 may include an inlet 40 formed through the ceiling 36 that connects to a coolant supply feed 42 and, through which, coolant is delivered to the plenum 33. The plenum 33 may also include outlet ports 38 formed through the floor 37 of the plenum 33. The outlet ports 38 may fluidly communicate with one or more cooling channels 44 that are formed through the interior of the airfoils 45 of the stator blades 17. In this manner, the plenum 33 may be used to deliver coolant to the stator blades 17. As also shown, the cooling channels 44 within the stator blades 17 may connect to a surface port 48 formed through an outer surface of the airfoil 45, which serves as an outlet for expelling coolant from the airfoil 45.

The plenum 33 may be axial defined by structure associated with upstream and downstream shrouds 49. Such shrouds 49 generally attach to the turbine casing 34 and define the outer radial boundary 24 of the flowpath 21 that occurs just opposite the outboard tips of the rotor blades 16 in the rows of rotor blades to each side of the stator blades. As will be appreciated, hot air leakage—as indicated by arrows 50—typically enters the plenum 33 from seams or leakage pathways formed through the structure associated with the upstream shroud 49 and/or other components. This leakage may continue from the plenum 33 through leakage pathways defined through the structure associate with the downstream shroud 49. As will be appreciated, this leakage introduces considerable heat to the plenum 33, which is undesirable because it warms the coolant within the plenum 33 and thereby reduces its cooling usefulness within the cooling channels 44 of the stator blades 17.

With reference also to FIG. 5, the length 51 of the plenum 33 may be generally described as extending between a first end and a second end, with the first end being defined by the location of one of the inlets 40 that supply the plenum 33 with coolant. Thus, as used herein (including the description relating to FIGS. 6 through 11) one of the plenum 33 may be described as including an inlet 40 formed through the ceiling 36 of the plenum 33 at a first end, with the plenum 33 extending circumferentially therefrom to the second end, which may be defined generally given the functionality of the plenum 33. Given this understanding, it will be appreciated that the configuration of FIG. 5 may be described as including two such plenums 33, which are connected at the first end of each, with each of the plenums 33 then extending in opposite circumferential directions from the inlet 40. As also shown, multiple outlet ports 38 may be formed through the floor 37 of each of the plenums 33 in FIG. 5. In use, several of these plenums 33 may extend circumferentially about the entirety of the flowpath 21 of the turbine 12, with the number of such plenums 33 depending on the number of inlets 40 formed through the turbine casing 34. Typically, because it is desirable to limit the number of openings formed through the turbine casing 34, the plenums 33 branching from one such inlet 40 cover an arc length that is between 12.5% and 25% of the total circumference of the outer radial boundary 24.

The conventional design for such plenums 33—as shown in FIGS. 4 and 5—has several shortcomings which have been found to cause the velocity of coolant flows therein to vary enough to compromise the intended distribution of coolant during operation. One reason for this is due to the general slowing of coolant flow velocity that occurs in the plenum 33 as the coolant moves away from the inlet 40. This slowing happens because the cross-sectional flow area of the plenum 33 remain substantially constant along its length while greater portions of the coolant introduced by the inlet 40 exits the plenum 33 through the outlet ports 38. As a result of this, intended levels of coolant may not be delivered to each of the outlet ports 38, which in turn may lead to regional overheating within both the casing 34, surrounding components, such as the shrouds 49, and among the stator blades 17. As will be appreciated, such "hotspots" typically increase rates of component deterioration and negatively impact engine efficiency.

With reference now to FIGS. 6 through 9, exemplary embodiments of the present invention will be discussed. As will be appreciated, FIG. 6 provides an axial sectional view of the plenum 33 that was introduced in relation to FIGS. 4 and 5, with the exception being the addition of a divider baffle 55. In accordance with the present invention, the divider baffle 55 may generally span the width of the plenum 33 and extend circumferentially over the length of the plenum 33. In this manner, the divider baffle 55 divides the plenum 33 into radially stacked first and second compartments 56, 57, with the first compartment 56 having an outboard position relative to the second compartment 57. Given this division, the first compartment 56 connects directly to the inlet 40, while the second compartment 57 connects directly to the outlet ports 38. According to the present invention, the divider baffle 55 is configured to divide the plenum 33 in such a way that a height (i.e., radial height) of the first compartment 56 varies along the length of the plenum 33. As illustrated, preferably, this is done such that the height of the first compartment 56 tapers between a greater height at the first end of the plenum 33 and a lesser height at the second end of the plenum 33.

More specifically, the height of the first compartment 56 may vary according to a smooth tapering profile in which the greater height at the first end of the plenum 33 gradually tapers to the lesser height at the second end of the plenum 33. The divider baffle 55 itself may have a constant and relatively thin height (i.e., radial height) such that, along the length of the plenum 33, the height (i.e., radial height) of the second compartment 57 varies in relation to the height of the first compartment 56. Thus, the height of the second compartment 57 may have a flaring profile between a lesser height at the first end of the plenum 33 and a greater height at the second end of the plenum 33, which, as depicted, is substantially the inverse of the profile of the first compartment 56. Several ports-which will be referred to herein as "baffle ports" or "baffle ports 59"-may be formed through the divider baffle 55 so to fluidly connect the first compartment 56 to the second compartment 57.

The baffle ports 59 may be circumferentially spaced between the first end and the second end of the plenum 33. According to an alternative embodiment (and as shown in FIG. 6), the circumferential positioning of the baffle ports 59 is made to correspond to the circumferential positioning of the outlet ports 38 of the plenum 33. Specifically, each of the baffle ports 59 may be positioned in relation to the circumferential position of a corresponding one of the outlet ports 38. In a preferred embodiment, each of the baffle ports 59 is circumferentially offset relative to the circumferential position of the outlet port 38 to which it corresponds. As depicted, this circumferential offset may be in the direction toward the first end of the plenum (or inlet 40), thus the circumferential position of the baffle port 59 is closer to the first end of the plenum 33 than the outlet port 38 that it corresponds to. As will be appreciated, coolant moving through the baffle ports 59 will have a circumferential flow component that results from the circumferential direction of the flow of the coolant through the first compartment 56. Because of this, the circumferential offset may be calibrated to take into account the circumferential flow component so that, upon reaching the floor 37 of the plenum 33, the coolant flow is more closely aligned with the corresponding outlet port 38 for aerodynamically improved ingestion thereby.

For the purposes of description, the forward and aftward directions are defined relative to a forward end of the turbine, at where a working fluid enters the turbine 12, and an aftward end of the turbine 12, at where the working fluid exits the turbine. Using these definitions, the width of the plenum 33 may be described as the distance between opposing forward and aftward interior walls 63, 64 of the plenum 33. As shown in FIGS. 7 through 9, the divider baffle 55, thus, may be described as including a forward edge, which connects to the forward interior wall 63 of the plenum 33, and an aftward edge 64, which connects to the aftward interior wall of the plenum 33.

As depicted in FIG. 6 through 9, the divider baffle 55 may have a smooth contour. Specifically, the divider baffle 55 may slightly curve in the circumferential direction, as shown in FIG. 6, while being mostly planar in the axial direction, as shown in FIGS. 7 through 9. Thus, the divider baffle 55 may be configured such that the first compartment 56 tapers smoothly between the greater height at the first end of the plenum 33 and the lesser height at the second end of the plenum 33. FIGS. 7 through 9, which provide sectional views along the indicated sight lines of FIG. 6, show an example as to the degree of height variance within the first compartment 56 that occurs between the first and second ends of the plenum 33. According to exemplary embodiments, the divider baffle 55 may be configured such that the greater height of the first compartment 56 at the first end of the plenum 33 is at least twice the lesser height of the first compartment 56 at the second end of the plenum 33. According to other embodiments, the divider baffle 55 is configured such that the greater height of the first compartment 56 at the first end of the plenum 33 is at least three times the lesser height of the first compartment 56 at the second end of the plenum 33.

As will be seen, the divider baffle 55 of the present invention may be configured to promote a substantially constant velocity for the flow of coolant moving through the first compartment 56. As will be seen, this may be accomplished by varying the flow area through the first compartment 56 relative to the flow area of the branching channels through which coolant is exiting the first compartment 56, which, in this case, are the baffle ports 59. Such design may be achieved as follows.

The divider baffle 55 may be configured such that the tapering of the height of the first compartment 56 decreases a cross-sectional flow area of the first compartment 56 as the first compartment 56 extends from the first end to the second end of the plenum 33. This rate of decrease in cross-sectional flow area will be referred to herein as a "first compartment rate of flow area decrease". The baffle ports 59 may be configured such that a cumulative cross-sectional flow area of the baffle ports 59 increases as the divider baffle 55 extends from the first end to the second end of the plenum 33. This rate of increase in cross-sectional flow area will be referred to herein as a "baffle ports rate of cumulative flow area increase". According to exemplary embodiments, the divider baffle 55 is configured within the plenum 33 such that the first compartment rate of flow area decrease is proportional to the baffle ports rate of cumulative flow area increase. The proportionality between the first compartment rate of flow area decrease and the baffle ports rate of cumulative flow area increase may be one that promotes a constant a velocity of a coolant flowing through the first compartment 56 during operation (i.e., from the inlet 40 to the baffle ports 59). More specifically, the first compartment rate of flow area decrease may be approximately equal to the baffle ports rate of cumulative flow area increase.

According to other examples, the configuration of the divider baffle 55 and plenum 33 is defined in relation to a ratio, which, as used herein, is defined as: the first compartment rate of flow area decrease divided by the baffle ports rate of cumulative flow area increase. According to certain preferred embodiments, the ratio may be exactly or substantially equal to 1.0. Pursuant to other embodiments, the ratio may be broadly defined as having a value between 0.8 and 1.2. It has been discovered by the present applicants that this range of values may be used to induce a substantially constant velocity of coolant flow within plenums 33 of this type. According to other embodiments, the ratio has a value between 0.9 and 1.1. According to still other embodiments of the present invention, the ratio may be slightly greater than one, for example, between approximately 1.0 and 1.2. This may be desirable, for example, to account for pressure losses while still maintaining a substantially constant coolant flow velocity. According to still other embodiments of the present invention, the ratio may be slightly less than one, for example, between approximately 0.8 and 1.0. This, for example, may be desirable to counter the effect that rising coolant temperatures within the plenum 33 have on flow velocity. As will be appreciated, as coolant moves through the first compartment 56, the heat absorbed by the coolant may cause expansion significant enough to materially increase flow velocity. Where such effects are considerable and it is otherwise desirable, this effect may be substantially nullified by setting the ratio at a value less than one.

The inlet 40 formed through the ceiling 36 of the plenum 33 may be the downstream end of a coolant supply feed 42. The coolant supply feed 42 may extend to an upstream end that connects to an extraction point at which compressed air is extracted from the compressor. According to preferred embodiments, as shown in FIG. 6, the coolant supply feed 42 is configured to have a downstream segment that includes a flaring profile 67. Specifically, the downstream segment, as used herein, is a relative short segment of the coolant supply feed 42 that is defined between a first end and a second end, where the second end is contiguous to the inlet 40 formed through the ceiling 36 of the plenum 33. The flaring profile 67 of the downstream segment, as depicted, is one that enlarges the cross-sectional flow area through the downstream segment between the first end and second end of the downstream segment. Preferably, the flaring profile is a conical shape, and may enlarge the cross-sectional flow area through the downstream segment by at least 100%. According to other embodiments, the flaring profile 67 of the downstream segment may be configured such that the resulting cross-sectional flow area of the inlet 40 is approximately equal to the combined cross-sectional flow areas of the fluid passageways that extend from the inlet 40 to carry away the coolant delivered by the inlet 40. Thus, the resulting cross-sectional flow area of the inlet 40 may be approximately equal to the combined cross-sectional flow areas of the two first compartments 56 of the plenums 33 that carry the inflow of the coolant from the inlet 40 in opposite circumferential directions. In cases where a baffle port 59 is located at the inlet 40, the combined cross-sectional flow area may include the cross-sectional flow area of the baffle port 59 too. Preferably, the cross-sectional flow area of the flared inlet 40 is between 0.8 and 1.2 times the combined cross-sectional flow areas of the two first compartments 56 of the connected plenums 33. Thus, in regard to a single one of the plenums 33, the cross-sectional flow area of the flared inlet 40 may be between 0.4 and 0.6 times the cross-sectional flow area of the first compartment 56 of the single plenum 33. Pursuant to these design considerations, the flaring profile 67 of the inlet 40 may be used to create a more uniform or aerodynamically balanced (and with less aerodynamic losses) flow of coolant through the transition occurring between the inlet 40 and the first compartments 56 of the paired plenums 33.

The stator blades 17 within the row of stator blades each may include one or more interior cooling channels 44 that extend through the interior of the airfoils 45. As will be appreciated, the cooling channels 44 circulate a coolant through an interior of the airfoil 45 during operation of the turbine 12. The coolant, once exhausted within the airfoil 45, may then be expelled through one or more surface ports 46. As shown, multiple outlet ports 38 may be formed through the floor 37 of the plenum 33. The outlet ports may be regularly spaced between the first end and the second end of the plenum 33. The outlet ports 38 formed through the floor 37 of the plenum 33 may connect and deliver coolant to the cooling channels 44 of the stator blades 17. In this manner, the plenum 33 may be used to distribute coolant to a group of consecutively arranged stator blades 17 within the row of stator blades.

As will be appreciated, the divider baffle 55 has been described with reference to its application within a single one of the plenums 33. Generally, as described above, a single plenum 33 corresponds to a particular arc length or portion of the circumference that is defined by the outer radial boundary 24 of the flowpath 21. As further anticipated by the present invention, a plurality of such plenums 33/divider baffle 55 configurations may be provided, each of the plurality having the same or very similar arrangement. As will be further appreciated, two such plenums 33 may paired with each of the inlets 40. In such cases, as illustrated in FIG. 6, such paired plenums 33 extend in opposite circumferential directions relative to each other from the inlet 40. Thus, a plurality of such plenums 33/divider baffle 55 configurations may be arranged end-to-end (i.e., in a non-overlapping way) such that together these configurations wrap circumferentially about an entirety of the outer radial boundary 24. In this manner, the plurality of plenums 33/divider baffle 55 configurations may be configured to deliver coolant to each of the stator blades 17 within one of the rows of stator blades. For example, the stator blades 17 with a single row may be divided into several groups (or "stator blade groups"), each of which may include a plurality of consecutively arranged stator blades 17. In such case, one of the plurality of plenums 33/divider baffle 55 configurations may be used to deliver coolant to a corresponding one of the stator blade groups.

Figure 11:
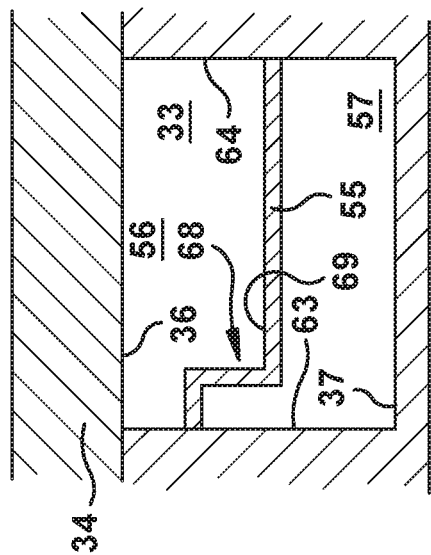
FIG. 11 is a sectional view of a divider baffle having an alternative edge profile according to an exemplary embodiment of the present invention.
Figure 10:
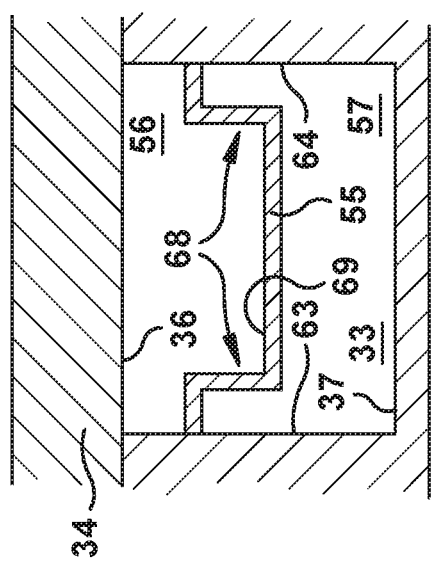
FIG. 10 is a sectional view of a divider baffle having an alternative edge profile according to an exemplary embodiment of the present invention.

FIGS. 10 and 11 provide additional sectional views of a divider baffle 55 having alternative edge profiles in accordance with the present invention. As illustrated, the divider baffle 55 may include what is referred to herein as a "stepped cross-sectional profile" 68. Specifically, the forward edge or the aftward edge of the divider baffle 55 may include the stepped cross-sectional profile 68. The stepped cross-sectional profile 68, as used herein, is one in which the position at which the edge of the divider baffle 55 connects to the forward or aftward interior wall 63, 64 is outboard of a main channel floor 69 defined by the central portion of the divider baffle 55 through the first compartment 56. Thus, for example: if the forward edge of the divider baffle 55 connects to the forward interior wall 63 at a first radial height; the aftward edge of the divider baffle 55 connects to the aftward interior wall 64 at a second radial height; and the main channel floor 69 defined by the divider baffle 55 through the first compartment 56 resides at a third radial height; then: a) the stepped cross-sectional profile 68 at the forward edge of the divider baffle 55 would include the first radial height being outboard relative to the third radial height; and b) the stepped cross-sectional profile 68 at the aftward edge of the divider baffle 55 would include the second radial height being outboard relative to the third radial height. According to alternate embodiments, the stepped cross-sectional profile 68 may be included at: the forward edge of the divider baffle 55 (as shown in both FIGS. 10 and 11); the aftward edge of the divider baffle 55 (as shown in FIG. 10); or both the forward edge and aftward edge of the divider baffle 55 (in the manner shown in FIG. 10).

Thus, as described, as the flow of coolant moves away from the inlet 40 of the plenum 33, the first compartment 56 formed by the divider baffle 55 may taper in proportion to the coolant leaving the first compartment 56 via the baffle outlets 59. This tapered configuration allows for the decreasing cross-sectional flow area of the first compartment 56 to match or be proportional to the cross-sectional flow area of the baffle ports 59 by which coolant is exiting. This may be used to achieve an approximate constant coolant velocity along the length of the first compartment 56, and this may be utilized to deliver a constant flow level of coolant to each of the baffle ports 59 and, in turn, to each of the outlet ports 38 of the plenum 33 that feed coolant to the cooling configurations of the stator blades 17. More generally, as will be appreciated, cooling configurations that promote such constant velocity may promote a balanced and predictable level of coolant flow through the various cooling circuits within the configuration. As a result, an intended level of coolant may be delivered to each component or region, which may prevent regional overheating so that the increased rate of component deterioration caused by such "hotspots" are avoided. The effective use of coolant may decrease the overall amount of coolant required, which also may translate into increased overall efficiency for the system.

Finally, the divider baffle 55 may provide other advantages in relation to the leakage flows that occur within the plenum 33. As stated, there is considerable heat introduced into the plenum 33 from leakage flows, for example, from the upstream shroud 49. Such leakage heats the coolant within the plenum 33 and thereby makes it less effective as a coolant inside the cooling channels 44 of the stator blades 17. The tapering divider baffle 55 alleviates the negative effect this leakage inflow has on the coolant within the plenum 33 by essentially elevating much of the coolant moving through the plenum 33 within the first compartment

56 to a position that is outboard of most of the leakage inflow. This reduces the interaction between the leakage inflow and the coolant within the plenum and thereby reduces the amount of heat exchange occurring therebetween. Additionally, the divider baffle 55 effectively shields the casing 34 of the turbine 12 from the elevated temperatures caused within the plenum 33 by such leakage, as the leakage inflow and higher temperatures it causes are mostly confined to the second compartment 57. This reduces the heat absorbed by the casing 34 during operation, which reduces thermal expansion and the stresses relate thereto. The alternative stepped cross-sectional profiles 68 introduced in FIGS. 10 and 11 may be used to further this effect, as these profiles may be used to make the connections between the edges of the divider baffle 55 and the forward and afterward interior walls 63, 64 of the plenum 33 even "higher" (i.e., closer to the ceiling 36 of the plenum 33), thereby shielding even more of the first compartment 56 from the leakage inflow and the higher temperatures associated therewith.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the present application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A gas turbine having a turbine that comprises an annular flowpath through which a working fluid is channeled among alternating rows of circumferentially spaced rotor blades and rows of circumferentially spaced stator blades, the turbine further including:
   inner radial and outer radial boundaries defining the annular flowpath that are concentrically formed about a central axis relative to which radial, axial, and circumferential directions are defined; and
   a turbine casing circumscribing and radially spaced from the outer radial boundary, the turbine casing having a radially inward surface and defining a plurality of casing apertures;
   a plenum positioned between the outer radial boundary of the annular flowpath and the turbine casing, the plenum circumferentially wrapping the outer radial boundary, wherein the plenum comprises a plurality of interconnected plenum volumes, each plenum volume of the plurality of interconnected plenum volumes comprising:
   a width defined in the axial direction;
   a length defined in the circumferential direction, the length of the plenum volume being a portion of a circumference of the plenum and extending between a first location radially inboard of one of the plurality of casing apertures and a second location circumferentially spaced from the first location;
   a height defined in the radial direction between a floor, which is an inboard interior wall of the plenum, and a ceiling, which is an outboard interior wall of the plenum, the outboard interior wall of the plenum being the radially inward surface of the turbine casing;
   an inlet formed by a respective one of the plurality of casing apertures through the ceiling of the plenum at the first location;
   outlet ports formed through the floor of the plenum and circumferentially spaced between the first location and the second location; and
   a divider baffle that spans the width of the plenum and that extends circumferentially between the first location and the second location of the plenum to divide the plenum into radially stacked first and second compartments, wherein the first compartment connects directly to the inlet, and the second compartment connects directly to the outlet ports;
   wherein the divider baffle is configured such that a height of the first compartment tapers between a greater height at the first location of the plenum volume and a lesser height at the second location of the plenum volume to decrease a cross-sectional flow area of the first compartment as the first compartment extends from the first location to the second location of the plenum volume pursuant to a first compartment rate of flow area decrease;
   wherein the divider baffle defines therethrough circumferentially spaced baffle ports that connect the first compartment to the second compartment; and
   wherein the baffle ports are configured such that a cumulative cross-sectional flow area of the baffle ports increases as the first compartment extends from the first location to the second location of each respective plenum volume pursuant to a baffle ports rate of cumulative flow area increase.

2. The gas turbine according to claim 1, wherein each of the baffle ports is circumferentially positioned in relation to a corresponding one of the outlet ports; and
   wherein the second compartment comprises a height that varies relative to the height of the first compartment, the height of the second compartment flaring between a lesser height at the first location of the plenum and a greater height at the second location of the plenum.

3. The gas turbine according to claim 2, wherein a circumferential position of each of the baffle ports is circumferentially offset from a circumferential position of the corresponding one of the outlet ports; and
   wherein the circumferential offset is in a direction toward the first location of the plenum.

4. The gas turbine according to claim 1,
   wherein the plenum is configured such that the first compartment rate of flow area decrease is equal to the baffle ports rate of cumulative flow area increase.

5. The gas turbine according to claim 1,
   wherein the plenum is configured according to a ratio defined as the first compartment rate of flow area decrease divided by the baffle ports rate of cumulative flow area increase; and
   wherein the ratio by which the plenum is configured comprises a value between 0.8 and 1.2.

6. The gas turbine according to claim 5, wherein the ratio by which the plenum is configured comprises a value between 0.8 and 1.0.

7. The gas turbine according to claim 5, wherein the ratio by which the plenum is configured comprises a value between 1.0 and 1.2.

8. The gas turbine according to claim 5, wherein forward and aftward directions are defined relative to a forward end of the turbine, where a working fluid enters the turbine, and an aftward end of the turbine, where the working fluid exits the turbine;
wherein the width of each plenum volume is defined between opposing forward and aftward interior walls of the plenum;
wherein the divider baffle includes a forward edge that connects to the forward interior wall of the plenum and an aftward edge that connects to the aftward interior wall of the plenum; and
wherein the ratio by which the plenum is configured comprises a value between 0.9 and 1.1.

9. The gas turbine according to claim 8, wherein the first compartment of the plenum comprises an outboard position relative to the second compartment of the plenum;
wherein each of the stator blades comprises:
an airfoil that juts into the annular flowpath of the turbine; and
a cooling channel configured for circulating a coolant through an interior of the airfoil during operation of the turbine; and
wherein each of the outlet ports through the floor of the plenum connects to at least one of the cooling channels of the stator blades.

10. The gas turbine according to claim 9, wherein the gas turbine comprises a compressor; and wherein the inlet formed through the ceiling of the plenum comprises a downstream segment of a coolant supply feed, wherein the coolant supply feed comprises an upstream end that is connected to an extraction point at which the coolant is extracted from the compressor.

11. The gas turbine according to claim 10, wherein the downstream segment of the coolant supply feed comprises a first coolant supply end and a second coolant supply end, wherein the second coolant supply end is defined by the inlet formed through the ceiling of the plenum; and
wherein the downstream segment of the coolant supply feed comprises a flaring profile, the flaring profile enlarging a cross-sectional flow area through the downstream segment between the first coolant supply end and second coolant supply end of the downstream segment.

12. The gas turbine according to claim 11, wherein the flaring profile comprises a conical shape that enlarges the cross-sectional flow area through the downstream segment by at least 100% between the first coolant supply end and the second coolant supply end of the downstream segment; and
wherein the flaring profile is configured such that the cross-sectional flow area of the second coolant supply end of the downstream segment is between 0.4 and 0.6 times the cross-sectional flow area of the first compartment at the first end of the plenum.

13. The gas turbine according to claim 9, wherein the divider baffle is configured such that the first compartment tapers smoothly between the greater height at the first location of the plenum volume and the lesser height at the second location of the plenum volume; and
wherein the divider baffle is configured such that the greater height of the first compartment at the first location of the plenum volume is at least twice the lesser height of the first compartment at the second location of the plenum volume.

14. The gas turbine according to claim 9, wherein the divider baffle is configured such that the first compartment tapers smoothly between the greater height at the first location of the plenum volume and the lesser height at the second location of the plenum volume; and
wherein the divider baffle is configured such that the greater height of the first compartment at the first location of the plenum volume is at least three times the lesser height of the first compartment at the second location of the plenum volume.

15. The gas turbine according to claim 9, wherein the divider baffle comprises a stepped cross-sectional profile in which a main channel floor of the divider baffle resides inboard of at least one of the forward edge and the aftward edge of the divider baffle.

16. The gas turbine according to claim 9, wherein the forward edge connects to the forward interior wall at a first radial height;
wherein the aftward edge of the divider baffle connects to the aftward interior wall at a second radial height;
wherein the main channel floor of the divider baffle resides at a third radial height;
wherein the divider baffle comprises a stepped cross-sectional profile, the stepped cross-sectional profile comprising a configuration in which at least one of the first radial height and the second radial height is outboard of the third radial height.

17. The gas turbine according to claim 9, wherein the forward edge connects to the forward interior wall at a first radial height;
wherein the aftward edge of the divider baffle connects to the aftward interior wall at a second radial height;
wherein a main channel floor of the divider baffle resides at a third radial height; and
wherein the divider baffle comprises a stepped cross-sectional profile, the stepped cross-sectional profile comprising a configuration in which the first radial height and the second radial height are both outboard of the third radial height.

18. The gas turbine according to claim 9,
wherein each plenum volume of the plurality of interconnected plenum volumes is configured to deliver the coolant to a unique set of the stator blades within the row of stator blades.

19. A turbine of a gas turbine engine, the turbine comprising an annular flowpath through which a working fluid is channeled among alternating rows of circumferentially spaced rotor blades and rows of circumferentially spaced stator blades, the turbine further including:
inner radial and outer radial boundaries defining the annular flowpath that are concentrically formed about a central axis relative to which radial, axial, and circumferential directions are defined;
a turbine casing circumscribing and radially spaced from the outer radial boundary, the turbine casing having a radially inward surface and defining a plurality of casing apertures;
a plenum positioned between the outer radial boundary of the annular flowpath and the turbine casing, the plenum circumferentially wrapping the outer radial boundary, wherein the plenum comprises a plurality of interconnected plenum volumes, each plenum volume of the plurality of interconnected plenum volumes comprising:
a length defined in the circumferential direction, the length of the plenum volume being a portion of a circumference of the plenum and extending between a first location radially inboard of one of the plurality of casing apertures and a second location circumferentially spaced from the first location;

a height defined in the radial direction between a floor, which is an inboard interior wall of the plenum, and a ceiling, which is an outboard interior wall of the plenum, the outboard interior wall of the plenum being the radially inward surface of the turbine casing;

an inlet formed by a respective one of the plurality of casing apertures through the ceiling of the plenum at the first location;

circumferentially spaced outlet ports formed through the floor of the plenum; and a divider baffle that spans the width of the plenum and that extends circumferentially between the first location and the second location of the plenum to divide the plenum into radially stacked first and second compartments, wherein the first compartment resides outboard of the second compartment such that the first compartment connects directly to the inlet and the second compartment connects directly to the outlet ports;

wherein circumferentially spaced baffle ports are formed through the divider baffle that connect the first compartment to the second compartment;

wherein the divider baffle is configured such that a height of the first compartment tapers between the first location and the second location of the plenum;

wherein, between the first location and the second location of the plenum, the tapering of the height of the first compartment decreases a cross-sectional flow area of the first compartment at a first rate;

wherein, between the first location and the second location of the plenum, a cumulative cross-sectional flow area of the baffle ports increases at a second rate; and wherein a ratio of the first rate to the second rate is between 0.9 and 1.1.

* * * * *